United States Patent [19]

Holinski

[11] Patent Number: 4,663,060

[45] Date of Patent: May 5, 1987

[54] SOLID LUBRICANT COMBINATION AND UTILIZATION THEREOF IN FRICTION LININGS

[75] Inventor: Ruediger Holinski, Munich, Fed. Rep. of Germany

[73] Assignee: Dow Corning GmbH, Munich, Fed. Rep. of Germany

[21] Appl. No.: 849,084

[22] Filed: Apr. 7, 1986

[30] Foreign Application Priority Data

Apr. 11, 1985 [DE] Fed. Rep. of Germany ....... 3513031

[51] Int. Cl.⁴ ................. C10M 125/02; C10M 125/24
[52] U.S. Cl. ....................... 252/12; 252/30; 252/32.5
[58] Field of Search ..................... 252/30, 32.5, 12, 23

[56] References Cited

U.S. PATENT DOCUMENTS 4,243,434 1/1981 Hartley et al. ......................... 252/30

FOREIGN PATENT DOCUMENTS

| 2514575 | 10/1976 | Fed. Rep. of Germany . |
| 2924540 | 1/1980 | Fed. Rep. of Germany . |
| 3046696 | 7/1982 | Fed. Rep. of Germany . |
| 73065 | 5/1982 | Japan ..................................... 252/30 |
| 1543592 | 3/1976 | United Kingdom . |
| 327774 | 9/1972 | U.S.S.R. ............................... 252/30 |

*Primary Examiner*—William R. Dixon, Jr.
*Assistant Examiner*—Ellen M. McAvoy
*Attorney, Agent, or Firm*—Alexander Weitz

[57] ABSTRACT

A solid lubricant combination comprising (a) 25 to 65 parts by weight graphite, (b) 15 to 45 parts by weight zinc sulfide, (c) 5 to 20 parts by weight antimony (III) sulfide, and (d) 5 to 20 parts by weight of an alkali earth metal phosphate, or other inorganic metal phosphate or mixtures of such phosphates which are commonly known as solid lubricants, is described. The solid lubricant combination is especially suitable as an additive to friction linings and results in an improvement in their tribological properties.

18 Claims, No Drawings

SOLID LUBRICANT COMBINATION AND UTILIZATION THEREOF IN FRICTION LININGS

This invention relates to a solid lubricant combination which is suitable as an additive to friction linings and results in an improvement in tribological properties of said linings.

BACKGROUND OF THE INVENTION

Friction linings such as, for example, brake linings and clutch linings, are usually based on asbestos fibers, mixtures of asbestos fibers and other heat resistant inorganic or organic fibers, asbestos-free mixtures of heat resistant inorganic or organic fibers, or metal powders such as iron powder, copper powders, steel powder or mixtures thereof, in combination with an organic monomeric or polymeric binder or binder mixture. Such friction linings may also contain fillers such as sound- and vibration-damping materials. The binder or binder mixture which is present in the starting mixtures is heat-curable and forms a solid and temperature-stable matrix in its cured state for the various components of the friction lining. While earlier common friction linings were based primarily on asbestos, more and more effort is now being made to replace the asbestos content in friction linings with other materials for the now familiar health reasons, in order to obtain friction linings which are entirely free of asbestos. In addition to the above components, asbestos-containing as well as asbestos-free friction linings usually also contain one or more solid lubricants in order to improve the tribological properties of such materials, particularly their friction and wear properties.

A friction lining based on asbestos fibers is described, for instance, in German Patent No. 3,046,696. A metal-based friction lining is the subject, for instance, of German Patent No. 2,924,540. German Patent No. 2,514,575 is directed to a solid lubricant combination which can also be incorporated in friction linings, among other things. Combination B described in Ex. 2 thereof (45% by wt. graphite, 36% by wt. zinc sulfide, 9% by wt. calcium fluoride and 10% by wt. molybdenum disulfide) is available commercially under the trademark LUBOLID 7365 and is already being added to asbestos-containing and asbestos-free friction linings in order to improve their tribological properties.

The known solid lubricant combinations and the friction linings prepared with them—fiber based as well as metal based—are on the whole not entirely satisfactory with respect to their tribological properties. This is especially true of the above product known as LUBOLID 7365. Friction linings having perhaps satisfactory wear properties and even adequately narrow coefficients of friction can indeed be prepared therewith, but not also friction linings which offer practically vibration-free operation and which transfer practically no lining material to the metallic friction surfaces. In addition, these solid lubricant combinations cannot always be incorporated with equally good results in the various compositions for preparing friction linings, so they cannot be universally incorporated into friction linings based on asbestos fibers, other fibers or even metal powders.

It is therefore the object of this invention to prepare a new solids combination which can be used especially as an additive to friction linings in order to improve their tribological properties, which can be universally incorporated in a great variety of compositions for the preparation of friction linings, especially in asbestos-free and semi-metallic friction linings, and which yields friction linings having low wear properties and narrow coefficients of friction which, above all, offer vibration-free operation, and which do not result in the transfer of lining material to the opposing friction plane of the article in question such as, for example, a brake disk or a clutch plate.

According to the present invention, this problem is now solved by the solids combination and its use as disclosed herein.

SUMMARY OF THE INVENTION

This invention relates to a solid lubricant combination comprising:
(a) 25 to 65 parts by weight graphite,
(b) 15 to 45 parts by weight zinc sulfide,
(c) 5 to 20 parts by weight antimony (III) sulfide, and
(d) 5 to 20 parts by weight of a common solid lubricant selected from the group consisting of alkaline earth metal phosphate, inorganic phosphate and mixtures of inorganic phospate and alkaline earth metal phosphate.

DETAILED DESCRIPTION OF THE INVENTION

The solid lubricant combination of the present invention is suitable as an additive to improve the tribological properties of friction linings based on a great variety of compositions and it offers, above all, special advantages even with the so-called semi-metal friction linings. The special compositions for preparing such friction linings are, therefore, according to the invention not critical, but what is decisive is the fact that a solid lubricant combination of the present invention is contained in such compositions. Compositions for certain known friction coatings become apparent from some of the patent literature discussed earlier. In each of the examples which follow, a composition for preparing asbestos-containing friction coatings or asbestos-free friction coatings is given, by which the universal utility of the solid lubricant combinations of the present invention is illustrated, and which represents the naturally preferred compositions for preparing friction linings with the solid lubricant combinations of the present invention. The various components contained in the compositions for preparing friction linings are known to those skilled in the art so that a detailed description of these components can be omitted.

The preparation of friction linings from the various compositions with or without the addition of solid lubricants or solid lubricant combinations—including the solid lubricant combination of the present invention—also depends on the means available to those skilled in the art. In the working examples which follow, methods for preparing asbestos-containing as well as asbestos-free friction linings are also given. Therefore, detailed descriptions thereof can also be omitted.

The effective components (a) to (d) which are present in the solid lubricant combination of the present invention individually represent already-known solid lubricants which are incorporated in such products in their ordinary commercial form. The particle sizes of these solid lubricants are therefore generally under 50 $\mu$m, preferably under 20 $\mu$m, and especially under 10 $\mu$m. They can be of either natural or synthetic origin, and this is especially true of graphite, zinc sulfide, and antimony (III) sulfide, because these materials occur in nature as well as being prepared in synthetic form. The solid lubricants of component (d) normally include totally synthetic products. Natural graphite normally offers certain advantages (slight wear and better stabilization of the coefficient of friction) over synthetic graphite because of its generally higher mechanical stability so that natural graphite is, as a rule, preferred over synthetic graphite. Therefore graphites having a crystallinity which is higher than 80% are preferably used in the solid lubricant combinations of the present invention. Mixtures of natural graphites and synthetic graphites may, of course, also be used.

Conditions for zinc sulfide and antimony (III) sulfide seem to be completely reversed. Here the synthetic products seem to be superior to the natural products because they apparently result in products which are more resistant to wear and which have more reliable friction values. Furthermore, these solid lubricants can also be used in the form of mixtures of natural and synthetic products. This is especially true of antimony (III) sulfide (i.e., $Sb_2S_3$) which can be advantageously employed in equal quantities of the mineral product and a product prepared synthetically by precipitation.

The alkali earth metal phosphates or other inorganic metal phosphates which are to serve as component (d) are best applied in the form of equivalent synthetic products because they do not occur in the requisite purity in some of their natural forms.

The components (a) to (d) which are present in the solids combination of the present invention are thus employed in those forms which are familiar to those skilled in the art and which are commercially available at the same time. Currently, zinc diphosphate (i.e., $Zn_2P_2O_7$) and, especially, calcium phosphate are preferred from among the solid lubricants which are possible as component (d). Comparable results could also be obtained, however, with other alkali earth metal phosphates or other inorganic metal phosphates which have already been familiar as solid lubricants up to the present time. Obviously, mixtures of various phosphates can be utilized. From among these, mixtures of calcium phosphate and zinc phosphate in a weight ratio of 1:1 are preferred.

Even though the preparation of the solid lubricant combination of the present invention, that is, the mixing of the various components of this combination can, in principal, take place in accordance with any of the common procedures therefor, the application of the method described in the examples which follow which consists of simply mixing the individual components in a tumbler and subsequently grinding the mixture in a hammer mill or some similar mill is preferred. Simple mixing in a tumbler, however, apparently does not yield the excellent product properties upon further processing to friction linings, which are obtained if the solid lubricant combination which is required is prepared by employing a combination of simple mixing and grinding. It is precisely the grinding process which may be responsible for the fact that agglomerates of the individual solid lubricants are broken up cleanly so that the tribological properties of the friction linings prepared therefrom become more propitious overall.

In order to effect the mixing of the lubricant combination of the present invention, it may be necessary to create an especially close contact which is attained by applying a relatively high mechanical force.

A thorough and uniform mixing is, of course, also necessary for the preparation of the composition if the solid lubricant combination of the present invention is employed, from which the required friction lining is then prepared. Here it may be necessary to take into consideration the fact that the fiber structure or other structure of the components which are present in the current composition for friction linings must not be adversely affected. It is, therefore, best merely to mix the completed combined composition thoroughly in a tumbler, or some similar mixing apparatus with similar mixing characteristics, when preparing friction linings.

Other details on the preparation of the solid lubricant combination of the present invention, its incorporation in friction linings, and its effect on the tribological characteristics of such friction materials will become apparent from the examples which follow.

A. EXAMPLES OF SOLID LUBRICANT COMBINATIONS

The following examples illustrate the compositions of various inorganic solid lubricant combinations of the present invention or those included in the state of the art, in tabular format (Table 1). Specific amounts of the above solid lubricant combinations, always in pulverulent form, were first mixed with each other in a tumbling mixer for one hour and then ground in a hammer mill for another hour in order to break up all of the agglomerates present and to prepare a clean mixture having a particle size of less than 10 μm.

TABLE 1

| Combination | Components in Parts by Weight % | | | | | | |
|---|---|---|---|---|---|---|---|
| | Graphite C | Zinc Sulfide ZnS | Antimony III Sulfide $Sb_2S_3$ | Calcium Phosphate $Ca_3(PO_4)_2$ | Zinc Di-Phosphate $Zn_2P_2O_7$ | Molybdenum Disulfide $MoS_2$ | Calcium Fluoride $CaF_2$ |
| Example 1 (Invention) | 50 | 30 | 10 | 10 | — | — | — |
| Example 2 (Invention) | 30 | 40 | 15 | 15 | — | — | — |
| Example 3 (Invention) | 60 | 20 | 10 | 10 | — | — | — |
| Example 4 (Invention) | 50 | 30 | 10 | — | 10 | — | — |
| Example 5 (Invention) | 30 | 40 | 15 | — | 15 | — | — |
| Example 6 (Invention) | 60 | 20 | 10 | — | 10 | — | — |
| Example 7 (Comparison) (Combination (B) of Ex. 2, Ger. Pat. 2,514,575 | 45 | 36 | — | — | — | 10 | 9 |

TABLE 1-continued

| Combination | Graphite C | Zinc Sulfide ZnS | Antimony III Sulfide $Sb_2S_3$ | Calcium Phosphate $Ca_3(PO_4)_2$ | Zinc Di-Phosphate $Zn_2P_2O_7$ | Molybdenum Disulfide $MoS_2$ | Calcium Fluoride $CaF_2$ |
|---|---|---|---|---|---|---|---|
| LUBOLID-7365) | | | | | | | |

B. EXAMPLE FOR UTILIZATION

The mixtures of the various solid lubricant combinations obtained in accordance with the above examples were incorporated in various amounts by weight in an asbestos-containing brake lining formulation as well as in an asbestos-free brake lining formulation, and the completed mixtures thus formed were then made into test articles having a specific shape and size by compressing them at elevated temperatures.

The asbestos-containing brake lining formulation (Formulation A) consisted of the following:

| Components | Amounts in Parts by Wt. (%) |
|---|---|
| Phenolic Resin (Phenol-Formaldehyde Resin having an average molecular weight of ca. 1,400 = DUREZ 14,000) | 12.1 |
| Asbestos Fibers | 39.7 |
| Barium Sulfate Powder | 28.0 |
| Mica Powder | 20.1 |
| | 100.0 |

The asbestos-free brake lining formulation (Formulation B) was as follows:

| Components | Amounts in Parts by Wt. (%) |
|---|---|
| Phenolic Resin (DUREZ = 14,000) | 12.0 |
| Iron Shavings | 57.0 |
| Mica Powder | 18.0 |
| Copper Shavings | 9.0 |
| Lead Dust | 3.0 |
| Zinc Dust | 1.0 |
| | 100.0 |

The brake lining compositions given below were prepared from the above formulations, A and B, alone or in combination with the mixtures of the various solid lubricant combinations contained in Examples 1-7.

Specific quantities of the formulations A and B given above were placed in a tumbler and were then mixed therein with specific quantities of the above mixtures of each solid lubricant combination in each of the corresponding weight ratios for one hour. The compositions thus obtained were thereupon compressed in a heated hydraulic press using a suitable molding tool at a pressure of 7.7 MPa and a temperature of 215° C., into molded bodies (test articles) having a diameter of 10 mm and a length of 11 mm (Table 2).

The articles consisting only of the Formulas A and B and containing no additive of a solid lubricant combination are prepared in the same manner and are designated as Control A or Control B (also Table 2).

TABLE 2

| Composition | Formulation A or B/ (Weight %) | Solid Lubricant Combination of Example No./(Weight %) |
|---|---|---|
| Control B | B (100) | —(—) |
| 1B | B (93) | 1 (7) |
| 2B | B (93) | 2 (7) |
| 3B | B (93) | 3 (7) |
| 4B | B (93) | 4 (7) |
| 5B | B (93) | 5 (7) |
| 6B | B (93) | 6 (7) |
| 7B | B (93) | 7 (7) |
| Control A | A (100) | —(—) |
| 1A | A (95) | 1 (5) |
| 4A | A (95) | 4 (5) |
| 7A | A (95) | 7 (5) |

C. EXAMINATION OF TEST ARTICLES

The test articles obtained by processing the compositions cited in Table 2 or those containing only formulation A or B were subjected to the following examinations in order to ascertain the tribological properties (coefficient of friction, wear properties, transfer of lining material to the brake disk, operating properties) which are essential for the qualitative evaluation of friction surfaces.

The apparatus employed for these tests consisted of a cast iron ring having a diameter of 12 cm. which formed the brake disk and which could be heated to a temperature of up to 530° C. by electrical heating means. The temperature of the brake disk could be measured with a thermoelement mounted therein. A disk to which the test articles could be fastened was coaxially mounted opposite the brake disk and was connected to a starting switch, could be run at various rotary speeds of up to 1800 rpm by means of an electric synchromotor. Three test pieces were placed in the fastening plate at 120° angles to each other at the surface facing the brake disk. A pressure spring, which could be adjusted to take various pressures, made it possible to force the brake disk against the test piece, which was in the fastening plate, under whatever pressure was desired so that any pressure which was required for whatever length of testing time desired, was kept constant. The frictional force which was exerted on the brake disk via the test piece in the fastening plate was measured by means of a friction gauge attached to it.

Every test was executed at a constant rotary speed of the fastening plate of 1800 rpm (i.e., equivalent to a sliding speed of 10 m/s of the test pieces against the brake disk) and at a constant pressure of 0.4 MPa of the brake disk against the test pieces. The temperature of the brake disk was left at room temperature while the individual test program ran through its various stages, or it was set at 350° C., or even at 530° C., at the beginning of a certain stage, whereby the starting temperature (whatever it may have been) and the temperature increase resulting from the friction during the test were measured by the thermoelement placed at the surface of the brake disk. Prior to each test the surface of the brake disk was given a surface texture (roughness) $R_a$ of ca. 0.30 μm by means of an abrasive disk and by cleaning with a solvent.

Every test was carried out under the above constant squeeze pressure in accordance with the following standardized program (familiar to European brake lining manufacturers):

a. One hour at 1800 rpm without preheating the brake disk.

b. Two hours at 1800 rpm after preheating the brake disk to 350° C.

c. Cooling the brake disk to room temperature.

d. Two hours while intermittently starting and stopping the brake disk, after it had been preheated to 530° C., at a maximum rotary speed of 1800 rpm.

e. Cooling the brake disk to room temperature.

f. One hour at 1800 rpm without heating the brake disk.

The (d) portion of the above program (intermittently starting and stopping the brake disk) was carried out as follows:

The electromotor was started and the fastening plate which holds the test pieces was accelerated to a constant rotary speed of 1800 rpm within ten seconds. The apparatus was then allowed to run at this maximum rotary speed for 10 seconds and the electromotor was then switched off, bringing the fastening disk to a halt within 2 seconds. After a halt of 5 seconds the electromotor was restarted and the fastening plate was again brought to the maximum rotary speed of 1800 rpm in the manner described above. This procedure was repeated during all of the two hours of the (d) portion of the program. At the same time, the temperature range at the fastening plate was taken throughout the whole test period.

In every test program the work was carried out with a single brake disk. At the end of the test it was examined with an optical microscope for wear and for transfer of lining material to the brake disk (stain formation). The quality of operation (quiet operation to heavily vibrating operation) between the test piece and the brake disk was also evaluated throughout the individual tests.

The results obtained from these tests can be found in Table 3 which follows.

nations instead of the solid lubricant combinations of the present invention, showed that such test pieces did not exhibit the sum of the favorable tribological properties of the test pieces based on the present invention. Consequently, the solid lubricant combination of the present invention apparently results in a synergistic effect.

This does not, however, indicate that similar friction linings could not contain additional other solid lubricants in addition to the solid lubricant combination of the present invention. Therefore, other solid lubricants could possibly even be contained therein provided the combination of the four solid lubricant combinations (a) to (d) of the present invention are always present in the prescribed ratio to each other and if, of course, there is no deleterious effect on the favorable and uniform tribological properties obtained by means of the present invention because of the additional presence of other solid lubricants.

The above test results show that the solid lubricant combinations of the present invention can be incorporated in asbestos-containing, as well as in asbestos-free semi-metal friction linings with good results and that they will hereby yield linings which, in addition to a relatively low wear constant and a friction value ranging over only a narrow field, are also distinguished by the fact that they permit almost no transfer of lining material to the brake disks and that they assure vibration-free operation when compared with the known solid lubricant combinations for friction linings.

This is especially important because a disturbance-free and consistently reliable brake performance is assured thereby.

Other direct probings of the brake linings prepared in accordance with the present invention in passenger vehicles and with the use of a dynamometer have shown that these linings are distinguished by a well-balanced spectrum of propitious properties, namely, minor wear of the brake linings and the brake disks, low noise levels, low fatigue, minor cold-start sensitivity, and practically stable friction values at the various operating temperatures. Such friction linings are therefore especially suitable anywhere where extremely high demands are posed whereby, first and foremost, the favorable performance of semi-synthetic and asbestos-

TABLE 3

| Composition of Test Piece | Wear mm | Range* of Friction Value (μ) | Transfer of Coating Material To The Brake Disc | Operation |
|---|---|---|---|---|
| Control B | 8.0 | 2.2 | No Transfer | Agitated |
| 1B | 1.8 | 0.5 | No Transfer | Quiet |
| 2B | 2.4 | 1.2 | No Transfer | Relatively Quiet |
| 3B | 2.7 | 1.1 | No Transfer | Relatively Quiet |
| 4B | 1.9 | 0.5 | No Transfer | Quiet |
| 5B | 2.3 | 1.0 | No Transfer | Realtively Quiet |
| 6B | 2.7 | 1.1 | No Transfer | Realtively Quiet |
| 7B (Comparison) | 1.8 | 0.6 | Heavy Transfer | Vibrations |
| Control A | 3.0 | 2.0 | No Transfer | Agitated |
| 1A | 0.6 | 0.5 | No Transfer | Relatively Quiet |
| 4A | 0.6 | 0.5 | No Transfer | Relatively Quiet |
| 7A (Comparison) | 0.5 | 0.6 | No Transfer | Quiet |

*Maximum friction coefficient minus minimum friction coefficient observed during test.

Examinations of similar asbestos-containing and asbestos-free test pieces of the above type, but which contained equivalent parts by weight (percentage amounts) of individual solid lubricants of this combination or mixtures of 2 or 3 such solid lubricants—possibly also in ratios other than those prescribed by the invention—or even different solid lubricants or solid lubricant combifree friction linings is especially surprising.

I claim:
1. A solid lubricant combination, comprising:
(a) 25 to 65 parts by weight graphite;
(b) 15 to 45 parts by weight zinc sulfide;
(c) 5 to 20 parts by weight antimony (III) sulfide; and

(d) 5 to 20 parts by weight of a common solid lubricant selected from the group consisting of alkaline earth metal phosphate, inorganic phosphate and mixtures of inorganic phosphate and alkaline earth metal phosphate.

2. A solid lubricant combination according to claim 1, characterized in that it comprises 45 to 55 parts by weight of component (a), 25 to 35 parts by weight of component (b), 8 to 12 parts by weight of component (c), and 8 to 12 parts by weight of component (d).

3. A solid lubricant combination according to claim 1, characterized in that it comprises 50 parts by weight of component (a), 30 parts by weight of component (b), 10 parts by weight of component (c) and 10 parts by weight of component (d).

4. A solid lubricant combination according to claim 1, characterized in that component (d) is selected from the group consisting of aluminum phosphate, calcium phosphate, iron phosphate, magnesium phosphate, zinc pyrophosphate and mixtures thereof.

5. A solid lubricant combination according to claims 2, characterized in that component (d) is selected from the group consisting of aluminum phosphate, calcium phosphate, iron phosphate, magnesium phosphate, zinc pyrophosphate and mixtures thereof.

6. A solid lubricant combination according to claims 3, characterized in that component (d) is selected from the group consisting of aluminum phosphate, calcium phosphate, iron phosphate, magnesium phosphate, zinc pyrophosphate and mixtures thereof.

7. A solid lubricant combination according to claim 1, characterized in that component (d) is calcium phosphate.

8. A solid lubricant combination according to claim 2, characterized in that component (d) is calcium phosphate.

9. A solid lubricant combination according to claim 3, characterized in that component (d) is calcium phosphate.

10. A friction lining composition, containing from 1 to 10% by weight of the solid lubricant combination of claim 1.

11. A friction lining composition, containing from 1 to 10% by weight of the solid lubricant combination of claim 2.

12. A friction lining composition, containing from 1 to 10% by weight of the solid lubricant combination of claim 3.

13. A friction lining composition, containing from 1 to 10% by weight of the solid lubricant combination of claim 4.

14. A friction lining composition, containing from 1 to 10% by weight of the solid lubricant combination of claim 5.

15. A friction lining composition, containing from 1 to 10% by weight of the solid lubricant combination of claim 6.

16. A friction lining composition, containing from 1 to 10% by weight of the solid lubricant combination of claim 7.

17. A friction lining composition, containing from 1 to 10% by weight of the solid lubricant combination of claim 8.

18. A friction lining composition, containing from 1 to 10% by weight of the solid lubricant combination of claim 9.

* * * * *